(12) United States Patent
Bodeddula et al.

(10) Patent No.: US 11,170,045 B2
(45) Date of Patent: Nov. 9, 2021

(54) METHOD AND SYSTEM FOR INTERACTIVE SEARCH INDEXING

(71) Applicant: ADP, Inc., Roseland, NJ (US)

(72) Inventors: Nagamalleswara Bodeddula, Pasadena, CA (US); Deepak Gupta, Hyderabad (IN); Vijaya Mahesh Sayi, Hyderabad (IN); Ravi Lankalapalli, Hyderabad (IN); Madhusudhan Kakurala, Hyderabad (IN); Ram Sama, Hyderabad (IN); Srikanth Chintamaneni, Hyderabad (IN); Gopal Prasad, Hyderabad (IN); Harsh Sharma, Pune (IN); Anuradha Verma, Alpharetta, GA (US); Kenneth Kingery, San Dimas, CA (US); Michael Plonski, Pasadena, CA (US); Ajit Kumar, San Dimas, CA (US); Arjun Hegde, Pasadena, CA (US); Margaret Aronson-Olague, Pasadena, CA (US); Akshay Chopra, Pasadena, CA (US); Maria Rios, Pasadena, CA (US); Jie Huang, Pasadena, CA (US); Christine Wymore, Pasadena, CA (US); Pablo Budke, Pasadena, CA (US)

(73) Assignee: ADP, Inc., Roseland, NJ (US)

( * ) Notice: Subject to any disclaimer, the term of this patent is extended or adjusted under 35 U.S.C. 154(b) by 90 days.

(21) Appl. No.: 16/706,446

(22) Filed: Dec. 6, 2019

(65) Prior Publication Data

US 2021/0173867 A1 Jun. 10, 2021

(51) Int. Cl.
*G06F 16/901* (2019.01)
*G06F 16/903* (2019.01)
*G06N 20/00* (2019.01)

(52) U.S. Cl.
CPC ...... *G06F 16/901* (2019.01); *G06F 16/90335* (2019.01); *G06N 20/00* (2019.01)

(58) Field of Classification Search
None
See application file for complete search history.

(56) References Cited

U.S. PATENT DOCUMENTS

| 7,672,928 B2 | 3/2010 | Maloney et al. |
| 8,112,441 B2 | 2/2012 | Ebaugh et al. |

(Continued)

*Primary Examiner* — Scott A. Waldron
(74) *Attorney, Agent, or Firm* — Yee & Associates, P.C.

(57) ABSTRACT

A method, computer system, and computer program product are provided for processing an output of batch processed information. A document storage system receives the output of batch processed information from a number of company portals, websites, and online systems of organization. The document storage system separates the output into individual documents and individual forms. The document storage system indexes the individual documents and forms according to metadata. The metadata includes structural attributes extracted from the individual documents and forms, and company relevant parameters identified from business intelligence for the organization. The document storage system stores the individual documents and forms in association with the metadata. Responsive to storing the individual documents and forms, the document storage system generates an event message. The event message comprises information about the storing of the individual documents and forms. The document storage system publishes the event message to a message pipeline. The document storage system notifies a subscribed client device about the event message, including a notification of availability of the individual documents and individual forms separated from the output.

21 Claims, 6 Drawing Sheets

(56) References Cited

U.S. PATENT DOCUMENTS

| | | |
|---|---|---|
| 8,370,373 B2 | 2/2013 | Yamamoto |
| 2007/0013967 A1* | 1/2007 | Ebaugh .............. G06F 16/2228 |
| | | 358/448 |
| 2010/0325102 A1* | 12/2010 | Maze ..................... G06F 16/93 |
| | | 707/722 |

* cited by examiner

METHOD AND SYSTEM FOR INTERACTIVE SEARCH INDEXING

BACKGROUND INFORMATION

1. Field

The present disclosure relates generally to an improved computer system and, in particular, to a method and apparatus for machine learning predictive modeling. Still more particularly, the present disclosure relates to a method and apparatus for indexing information based on an interactive search of the indexed information within a data context of a user.

2. Background

Companies have a great deal of information spread over many different portals, websites, and online systems. The larger the company, the more different systems and portals it is likely to have. New online content is produced daily by different departments, and finding the information you need can be very time consuming.

Human resources departments waste a lot of time pointing employees to the correct places to find the information they need. These interactions create a large unnecessary workload for the human resource personnel.

There are many commercial indexing and search tools that can be employed in an organizational system to aid users in locating desired information. However, most users and companies do not know how to feed data from their existing portals and websites to the search tools. Often each company portal has its own search box and fails to search data from the many other company portals and websites. Often the search tool is presented as a standard search box which returns too many irrelevant or unfriendly search results. Search results usually do not consider user context. Furthermore, existing commercial indexing and search tools do not notify users as new information becomes available.

Therefore, it would be desirable to have a method and apparatus that centralizes this organizational information and make it available to everyone in the company in a friendly and easy-to-use way. Furthermore, it would be desirable to have a method and apparatus that reduce the unnecessary work load of a human resources personnel.

SUMMARY

Embodiments of the present disclosure provide a method, computer system, and computer program product are provided for processing an output of batch processed information. A document storage system receives the output of information batch processed from a number of locations in a computer system for an organization. The document storage system separates the output into individual documents and individual forms. The document storage system indexes the individual documents and forms according to metadata. The metadata includes structural attributes extracted from the individual documents and forms, and company relevant parameters identified from business intelligence for the organization. The document storage system stores the individual documents and forms in association with the metadata. Responsive to storing the individual documents and forms, the document storage system generates an event message. The event message comprises information about the storing of the individual documents and forms. The document storage system publishes the event message to a message pipeline. The document storage system notifies a subscribed client device about the event message, including a notification of availability of the individual documents and individual forms separated from the output.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that companies have a great deal of information spread over many different portals, websites, andonline systems. The larger the company, the more different systems and portals it is likely to have. New online content is produced daily by different departments, and finding the information you need can be very time consuming.

The illustrative embodiments recognize and take into account that human resources departments waste a lot of time pointing employees to the correct places to find the information they need. These interactions create a large unnecessary workload for the human resources personnel.

The illustrative embodiments recognize and take into account that commercial indexing and search tools that can be employed in an organizational system is presented as a standard search box which returns too many irrelevant or unfriendly search results. Most users and companies do not know how to feed data from their existing portals and websites to the search tools. Often, each company portal has its own search box that does not consider user context and fails to search data from the many other company portals and websites.

Figure 1:
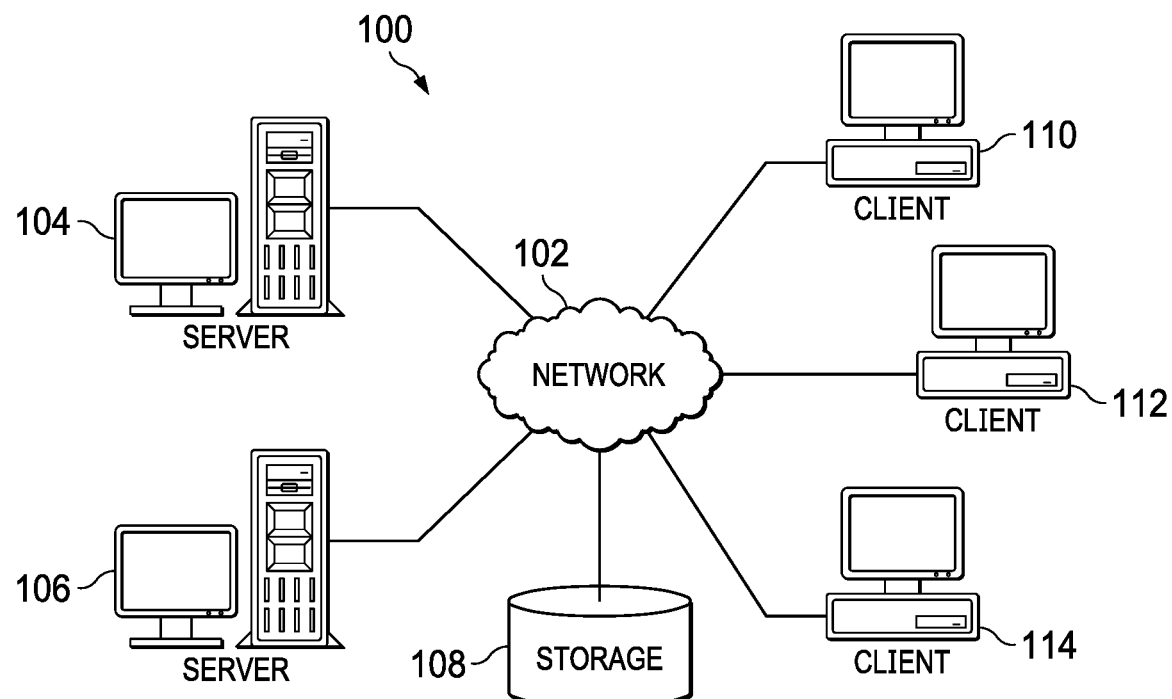
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

Figure 2:
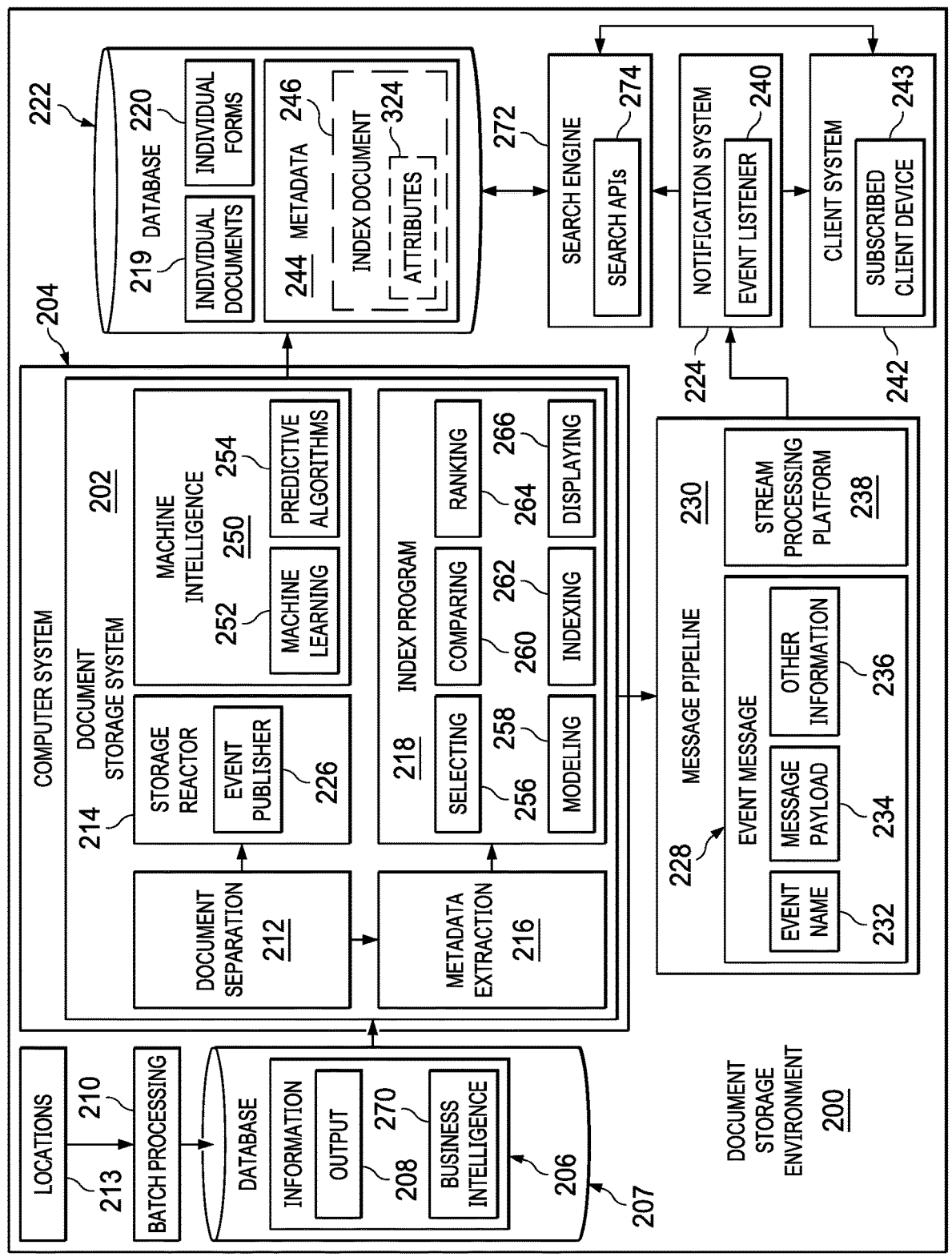
FIG. 2 is a block diagram of a document storage system in accordance with an illustrative embodiment.

Turning to FIG. 2, a block diagram of an document storage system is depicted in accordance with an illustrative embodiment. Document storage environment 200 includes document storage system 202 which can be implemented in one or more computer systems, such as one or more of server computer 104, server computer 106, client computer 110, client computer 112, and client computer 114 of FIG. 1.

In this illustrative example, document storage system 202 may be implemented in software, hardware, firmware, or a combination thereof. When software is used, the operations performed by document storage system 202 may be implemented in program code configured to run on hardware, such as a processor unit. When firmware is used, the operations performed by document storage system 202 may be implemented in program code and data and stored in persistent memory to run on a processor unit. When hardware is employed, the hardware may include circuits that operate to perform the operations of document storage system 202.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, document storage system 202 may be implemented in computer system 204. Computer system 204 is a hardware system that includes one or more data processing systems, such as one or more computers of network data processing system 100 of FIG. 1. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

In this illustrative example, document storage system 202 accesses information 206 in database 207. In this illustrative example, information 206 includes information about an organization.

As used herein, an organization may be, for example, a corporation, a partnership, a charitable organization, a city, a government agency, or some other suitable type of organization. Information about an organization may include, for example, at least one of information about people, products, research, product analysis, business plans, financials, or other information relating to or used by organizations. Information about an organization may be generated by one of an employee information system, a research information system, a sales information system, an accounting system, a payroll system, or some other type of system that is externally located from document storage system 202. In this illustrative example, information 206 includes output 208 from batch processing 210.

In the illustrative example, batch processing 210 can receive information from a number of locations 213. In the illustrative example, the number of locations 213 can include at least one of a company portal, a website, an online system, or other location in the organization.

As depicted, document storage system 202 includes a number of different components. As used herein, "a number of," when used in reference to components, means one or more components. As depicted, document storage system 202 includes document separation 212, storage reactor 214, metadata extraction 216, and indexing program 218.

Document separation 212 is configured to receive output 208, and separate output 208 into individual documents 219 and individual forms 220. Document separation 212 passes individual documents 219 and individual forms 220 to storage reactor 214, and metadata extraction 216.

Document separation 212 provides individual documents 219 and individual forms 220 to storage reactor 214. As used herein, reactors are software programs, or hardware alone, which are programmed to take action in response to events or reactors. Storage reactor 214 stores individual documents 219 and individual forms 220 in database 222.

Upon receiving information from document separation 212, storage reactor 214 may use that information to perform one or more actions. In accordance with an illustrative embodiment, storage reactor 214 may communicate the storage of individual documents 219 and individual forms 220 to other applications by publishing the event for consumption by other applications. For example, storage reactor 214 may include event publisher 226. Event publisher 226 may be configured to generate event message 228, and to publish event message 228 to message pipeline 230. In this example, storage reactor 214 may be referred to as a publishing application.

In accordance with an illustrative embodiment, the event message 228 includes one or more types of information. The information may merely identify and document storage event or otherwise indicate that individual documents 219 and individual forms 220 have been stored in database 222. Alternatively, the information may include additional information regarding the storage event.

Event name 232 may be used by subscribing applications to identify the relevant of event message 228 published on message pipeline 230. Message payload 234 may include some or all of information for the event, which can be storage of individual documents and forms 220. Event message 228 also may include other information 236 as may be appropriate. Event message 228 can also include a notification of availability of the individual documents and individual forms 220 separated from output 208.

Message pipeline 230 may be implemented in any appropriate manner. For example, message pipeline 230 may be implemented as stream processing platform 238. For example, without limitation, message pipeline 230 may be implemented using Apache Kafka open-source stream processing software platform or any other appropriate stream processing platform 238. Message pipeline 230 may be implemented as part of document storage system 202. Alternatively, message pipeline 230 may be implemented separate from document storage system 202, in whole or in part.

Other applications may be configured to listen for the publication of event message 228 on message pipeline 230. For example, notification system 224 may include corresponding event listener 240. Event listener 240 may be configured to listen for the publication of a relevant event message on message pipeline 230 and, in response to identifying the publication of a relevant event message on message pipeline 230, to receive the relevant message from message pipeline 230.

In this example, notification system 224 may be referred to as subscribing application. In this example, event message 228 is relevant to notification system 224 because notification system 224 is configured to perform corresponding actions in response to the storage of individual documents and forms 220, as identified from event message 228. Therefore, in this example, the event listener 240 will identify the publication of event message 228 message pipeline 230 and will receive event message 228 from message pipeline 230. Notification system 224 may then perform corresponding actions based on the information contained in event message 228.

Using one or more adapters, notification system 224 may convert event message 228 into an appropriate form for delivery to and use by client system 242. Alternatively, some or all of the functions performed by notification system 224 may be performed by client system 242 or by another system or function that may be implemented within or external to computer system 204.

As used herein, a system is external to computer system 204 if it does not use the resources of computer system 204 to perform actions. In other words, a system that is external to computer system 204 would not be considered to be a part of computer system 204 by a person of ordinary skill in the art.

A message or signal generated by notification system 224 may be delivered to client system 242 via an appropriate network connection between computer system 204 and a computer or other data processing system on which client system 242 is implemented. The connection may be, for example, without limitation, a wired connection, a wireless connection, a fiber optic connection, or any other appropriate connection or combination of connections for delivering a signal or message from document storage system 202 running in computer system 204 to client system 242. For example, notification system 224 may notify subscribed client device 243 in client system 242 about the event message 228. In this example, subscribed client device 243 subscribed client device 243 is a data processing system that has registered or requested to receive notifications. Subscribed client device, can be, for example, a desktop computer, a tablet computer, a mobile phone, or other suitable data processing system.

Document storage system 202 includes metadata extraction 216. Metadata extraction 216 automatically extracts metadata 244 from individual documents and forms 220 that were separated from output 208 by document separation 212. Metadata extraction 216 outputs the metadata 244 as index documents 246 for use by indexing program 218. Metadata extraction 216 may extract structural metadata from individual documents 219 and individual forms 220, such as for example, without limitation, a domain identifier such as a URL or system name, a page name, a section name, a media type, such as a form, video, or image, access permissions, such as for all company or managers only, a language in which the pages written, a main topic of the page, keywords in the page, and an access/entry point for the page, as well as other suitable types of metadata.

In one or more illustrative examples, computer system 204 comprises machine intelligence 250. Machine intelligence 250 comprises machine learning 252 and predictive algorithms 254. Document storage system 202 can use machine intelligence 250 to facilitate indexing metadata 244 and locating of individual documents and forms 220.

Machine intelligence 250 can be implemented using one or more systems such as an artificial intelligence system, a neural network, a Bayesian network, an expert system, a fuzzy logic system, a genetic algorithm, or other suitable types of systems. Machine learning 252 and predictive algorithms 254 may make computer system 204 a special purpose computer for dynamic predictive modelling of extracted metadata 244, and searching relevant individual documents 219 and individual forms 220 based on metadata, 244.

Indexing program 218 comprises selecting 256, modeling 258, comparing 260, indexing 262, ranking 264, and displaying 266. Using metadata 244, Indexing program 218 creates an index of individual documents 219 and individual forms 220. In particular, the metadata 244 contained within index document 246 is used by client system 242 to search for the related individual documents and forms 220.

Indexing program 218 indexes individual documents and forms 220 in database 222 according to the index attributes 268 contained in a related index document 246. In one or more illustrative examples, index attributes 268 can include the structural metadata extracted by metadata extraction 216, as well as metadata about business intelligence 270. Business intelligence 270 are company-relevant parameters, such as, without limitation, categories, audience, and area, as well as other company-relevant parameters. The categories include relevant categories within different parts of an organization, such as payments, benefits, training, as well as other suitable categories. The audience indicates a permitted or intended audience within the organization. The audience can be individuals, such as employees, managers, etc. The audience can be a group or department, such as accounting, human resources, development, legal, marketing, sales, etc. The area can indicate a permitted or intended geographic region. The company-relevant parameters may also include a language, main topics, and keywords.

A user at client system 242 can submit queries for information 206 to search engine 272 through one or more search APIs 274. Search engine 272 uses metadata 244 to search individual documents 219 and individual forms 220, and return search results of relevant ones of individual documents 219 and individual forms 220.

Thus, document storage system 202 transform a computer system 204 into a special purpose computer system as compared to currently available general computer systems that do not have a means to perform machine learning and predictive modeling of extracted metadata and business intelligence as a means for organizing and locating individual documents and forms in a database. Currently used general computer systems do not have a means to accurately predict and identify requested information according to metadata extracted from individual documents and identified business intelligence relevant to those documents.

Figure 3:
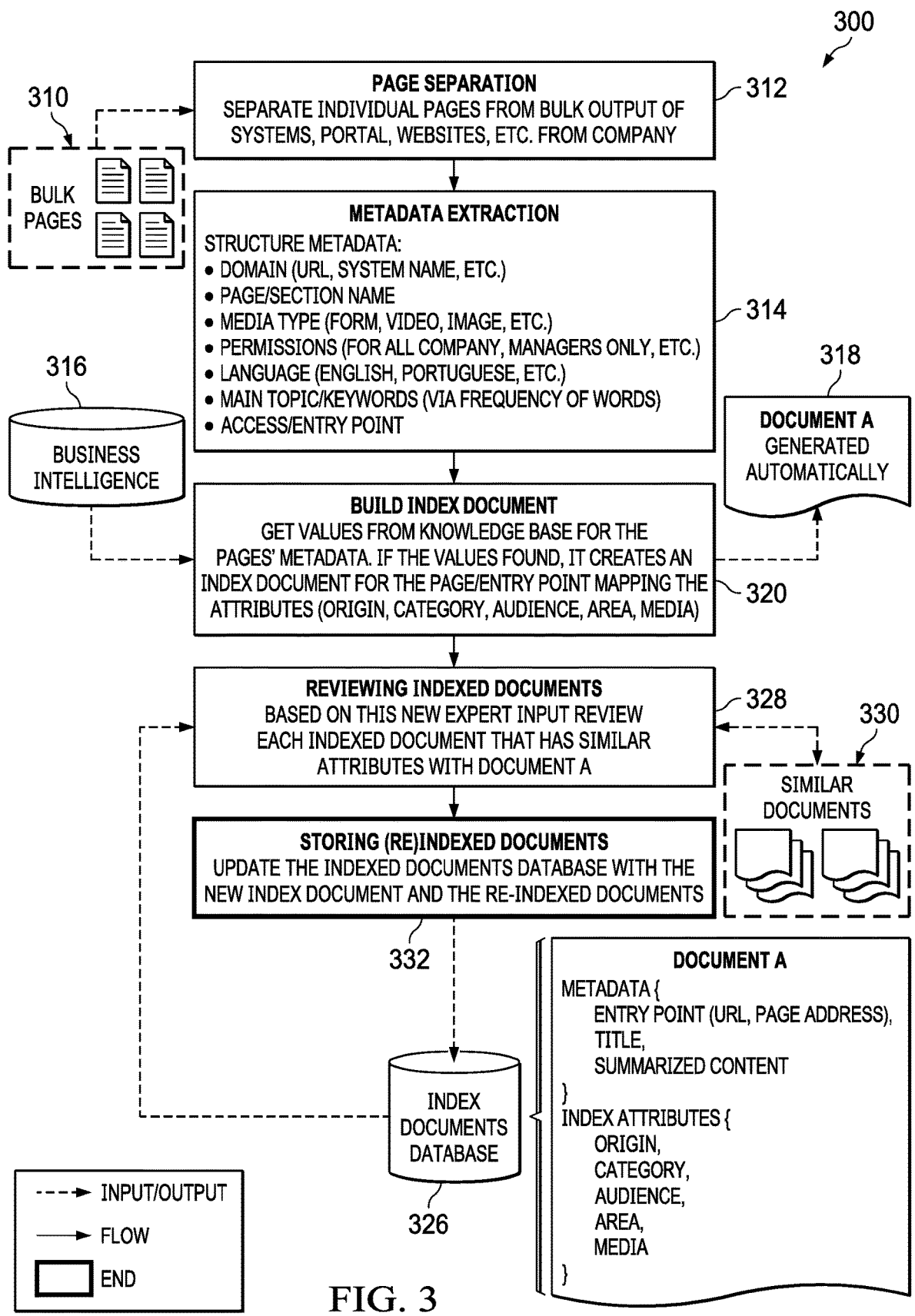
FIG. 3 is an illustration of a data flow for creating a database of indexed documents in accordance with an illustrative embodiment.

Turning to FIG. 3, an illustration of a data flow for creating a database of indexed documents is depicted according to an illustrative embodiment. The data flow illustrated in FIG. 3 can be implemented in one or more components of document storage system 202 of FIG. 2.

In process 300, as depicted, a system separates individual pages within the batch processing output 310 of information from systems, portals, websites, and other sources of electronic information for a particular organization (step 312). The pages can be separated by document separation 212 of FIG. 2.

Process 300 identifies metadata associated with the individual page (step 314). The metadata can include structural metadata for the page, extracted from pages in output 310 by metadata extraction 216 of FIG. 2.

In one illustrative embodiment, pages in output 310 are parsed to determine indexing fields for a related document. The indexing fields can be determined using one or more components of indexing 218 and machine intelligence 250 of FIG. 2.

Once the indexing fields are determined, values for the page's metadata are identified from business intelligence 316. If the values are found, index document 318 is built for the page/entry point at step 420. Index document 318 maps the identified index attributes, such as origin, category, audience, area, media, etc. to the individual pages separated from output 310.

At step 328, the system reviews each indexed document in indexed documents database 326 to identify other index documents 330 that have attributes similar to the attributes of index document 318. Reviewing indexed documents can be implemented using one or more components of indexing program 218 and machine intelligence 250 of FIG. 2.

At step 332, the system stores index document 318 in indexed documents database 326, and indexes index document 318 according to the index attributes of index document 318 and the similar attributes of other index documents 330.

Figure 4:
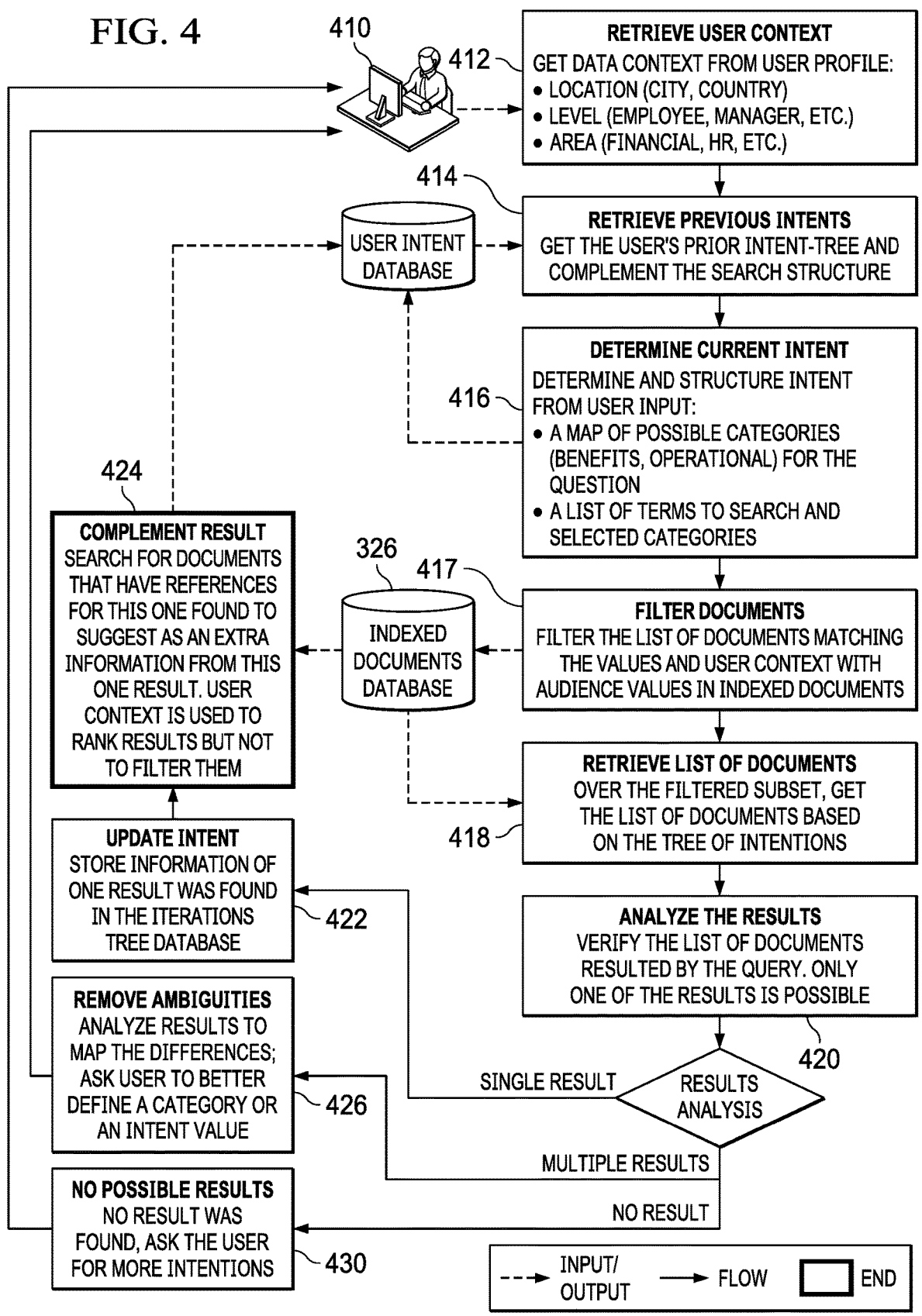
FIG. 4 is an illustration of a data flow for interactively searching an indexed database in accordance with an illustrative embodiment.

With reference next to FIG. 4, a data flow for interactively searching an indexed database is depicted in accordance with an illustrative embodiment.

At step 410, a system receives a search query. The search query can be received from a client system via search API, such as one of search APIs 274 of FIG. 2.

At step 412, the system determines a data context of the user of the client system. The data context can be associated with a particular organization, and can be determined based on various company-relevant parameters, such as a location of the user and a position of the user within the organization. The company-relevant parameters can be determined from information contained in the search query itself, or determined from information contained in a user profile of the user.

At step 414, the system retrieves the user's prior intent-tree. Using one or more of APIs 274 and machine intelligence 250 of FIG. 2, a system determines and structures intent from user input at step 416. For example, the system may identify a map of possible organizational categories, such as, for example, benefits, operations, and other relevant categories, for the query. Additionally, the system may identify a list of terms to search and selected categories of information. The system complements the user's prior intent-tree search structure based on the determined current intention.

At step 417, the system filters the documents in indexed documents database 222 according to the data context. The system matches the values and the user context of indexed documents to audience values indicated by specific the user context. The system then identifies the list of documents over the filtered subset based on the tree of intentions, at step 418.

At step 420, the system verifies the list of documents resulted by the query. In one illustrative example, the system returns only one possible of the result. If a single result is identified, the system stores the information of the one result in the user intent tree database at step 422. Based on the identified result, the system searches indexed documents database 222 for index documents that have references for this one result. The system suggests the related ones of individual documents and forms 220 as relevant search results at step 424. User context can be used to rank the relevant search results.

If multiple results are identified at step 420, the system analyzes results to map the differences between identified documents at step 426. Based on the mapped differences, the system may ask the user to better define a category or an intent value. If no results are identified outside of the user context, the system asks the user for more intentions at step 430.

Figure 5:
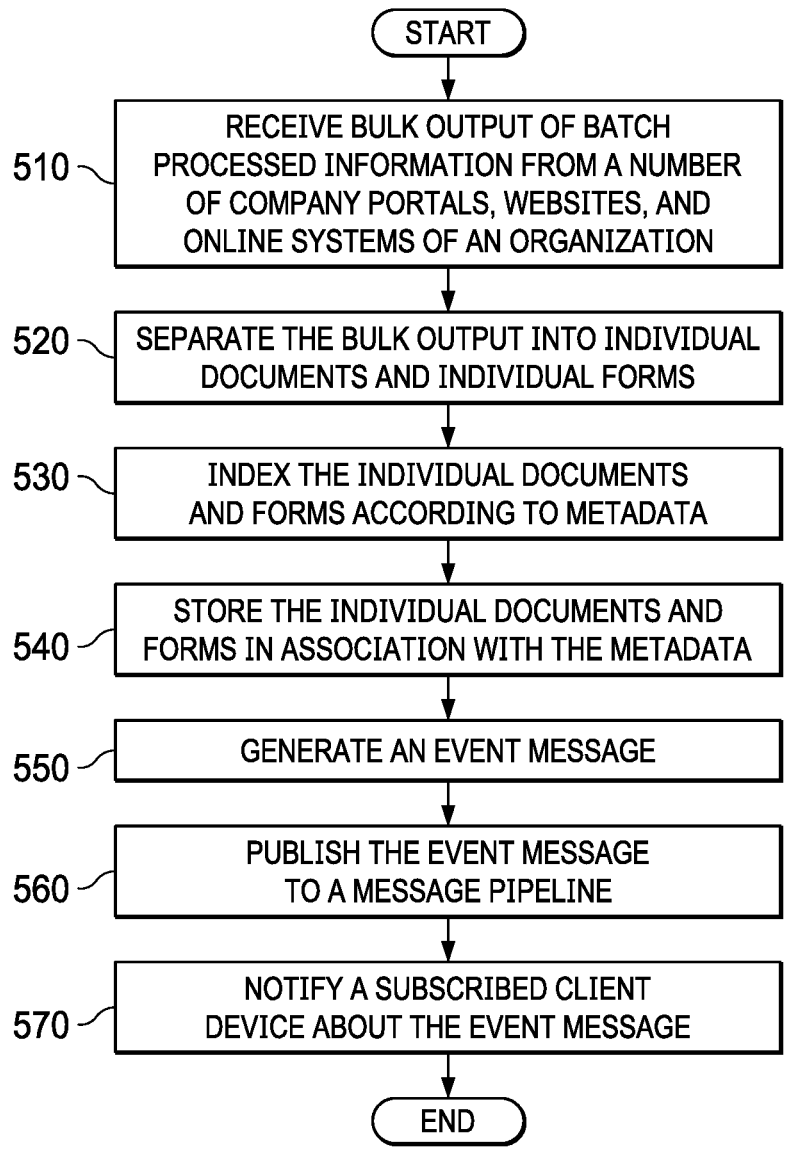
FIG. 5 is a flowchart of a method for indexing documents based on interactive user search in accordance with an illustrative embodiment.

With reference next to FIG. 5, a flowchart of a process for interactively locating information is depicted accordance with an illustrative embodiment. The process of FIG. 5 can be implemented in document storage system 202 of FIG. 2.

The process begins by receiving output of batch processed information from a number of company portals, websites, and online systems of organization (step 510).

The process separating the output into individual documents and individual forms (step 520).

The process indexing the individual documents and forms according to metadata (step 530). The metadata includes structural attributes extracted from the individual documents and forms, and company relevant parameters identified from business intelligence for the organization search query is received within a data context of the user in the organization.

The process stores the individual documents and forms in association with the metadata (step 540), and in response thereto, generates an event message (step 550). The event message comprises information about the storing of the individual documents and forms.

The process publishing the event message to a message pipeline (step 560), and notifies a subscribed client device about the event message (step 570). The notification includes an indication of availability of the individual documents and individual forms that were separated from the output. The process terminates thereafter.

Figure 6:
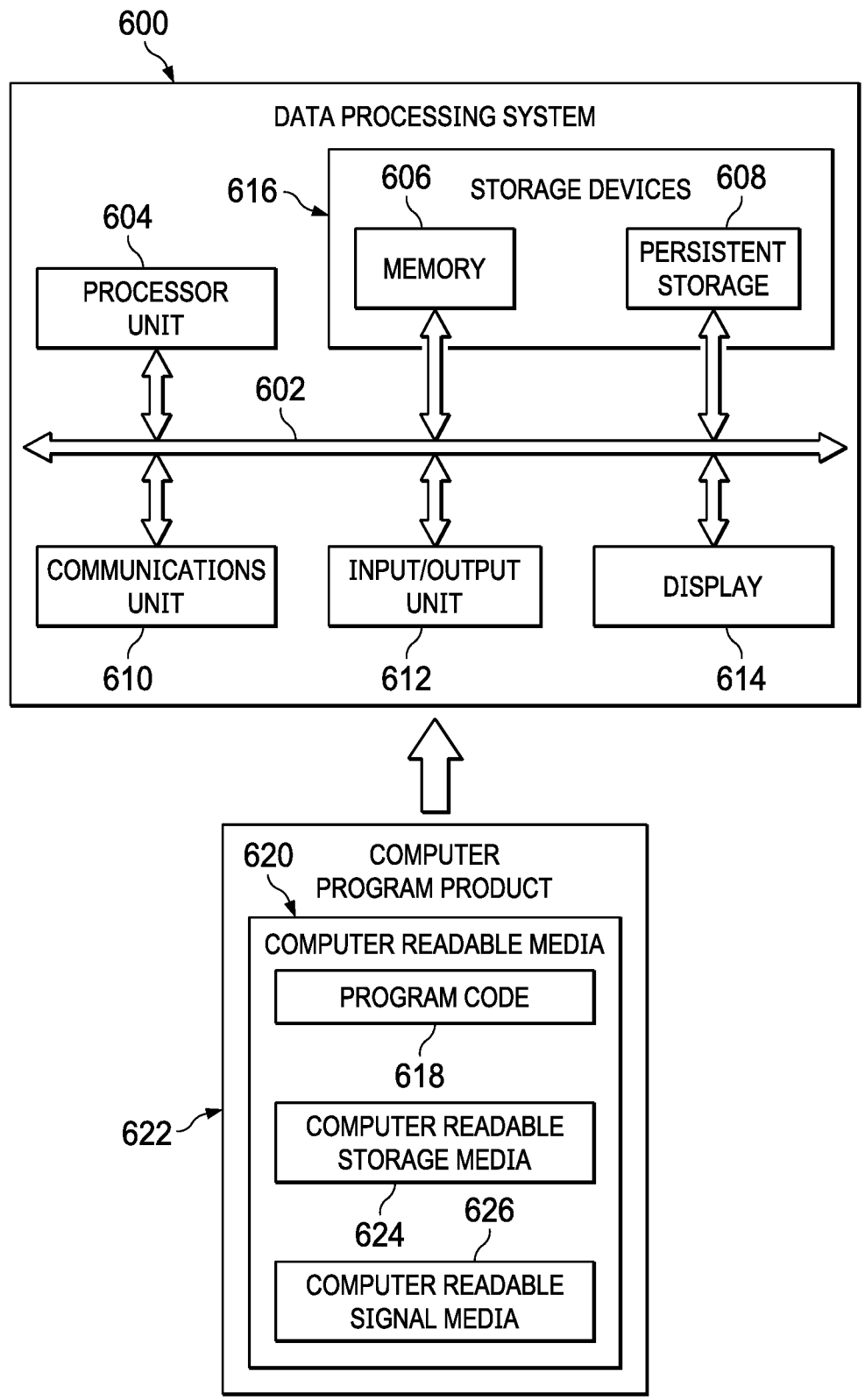
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement one or more computers and client computer system 112 in FIG. 1. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general purpose central processing units (CPUs). In an alternate embodiment, processor unit 604 comprises one or more graphical processing units (CPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Alternatively, program code 618 may be transferred to data processing system 600 using computer-readable signal media 626.

Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for processing an output of batch processed information, the method comprising:
    using a number of processors of a machine learning predictive modeling system to perform the steps of:
    receiving the output of information batch processed from a number of locations in a computer system for an organization;
    separating the output into individual documents and individual forms;
    extracting, by a machine learning model, metadata for the individual documents and forms, wherein the metadata includes structural attributes extracted from the individual documents and forms, and company relevant parameters identified from business intelligence for the organization;
    building a new index document, wherein the new index document comprises values for the extracted metadata;
    comparing the new index document with other stored index documents stored in an indexed document database;
    identifying a subset of documents in the indexed documents database that have index attributes similar to the new index document;
    storing the new index document in association with the metadata;
    indexing the new index document and re-indexing the index documents with similar index attributes;
    responsive to storing the new index document, generating an event message, wherein the event message comprises information about the storing of the individual documents and forms;
    publishing the event message to a message pipeline; and
    notifying a subscribed client device about the event message, including a notification of availability of the individual documents and individual forms separated from the output.

2. The computer-implemented method of claim 1, wherein indexing the individual documents and forms further comprises:
    extracting structural metadata from the individual documents and forms;
    identifying the company relevant parameters from a database of business intelligence for the organization;
    building an index document for each of the individual documents and forms, wherein each index document includes the structural metadata and the company relevant parameters; and
    generating an index from the index documents.

3. The computer-implemented method of claim 2, wherein the company relevant parameters comprise:
    a category of information about human resources, wherein the category is selected from the group consisting of payments, benefits, and training;
    an intended audience within the organization, wherein the intended audience indicates employees to whom the information is relevant, wherein the intended audience is selected from a group consisting of employees and managers; and
    a department in the organization, wherein the department indicates divisions of the organization to which the information is relevant, wherein the department is selected from a group consisting of a finances department, a human resources department, a product development department, a marketing department, and a sales department.

4. The computer-implemented method of claim 2, wherein the structural attributes extracted from the individual documents and forms comprise:
    a domain identifier, a page name, a section name, a media type, access permissions, a language for the page, a main topic of the page, keywords in the page, and an access/entry point for the page.

5. The computer-implemented method of claim 1, further comprising:
    receiving a search query from a client system, wherein the search query is received within a data context of a user in the organization;
    interpreting the search query according to the data context of the user within the organization;
    predicting the most suitable choices for the individual documents and forms based on the data context of the user; and
    identifying at least one of the individual documents and forms according to the interpreted search query.

6. The computer-implemented method of claim 5, wherein identifying at least one of the individual documents and forms further comprises:
    filtering the index documents according to the data context of the user within the organization; and
    identifying at least one of the individual documents and forms from a filtered subset of the index documents.

7. The computer-implemented method of claim 6, further comprising:
    ranking the filtered subset of the index documents according to the data context of user; and
    suggesting the individual documents and forms that correspond to the filtered subset of the index documents as search results.

8. A machine learning predictive modeling system for processing an output of batch processed information, the system comprising:
- a computer system;
- a processor unit; and
- a document storage system in communication with the processor unit, wherein the document storage system:
  - receives the output of information batch processed from a number of locations in a computer system for an organization;
  - separates the output into individual documents and individual forms;
  - extracts, by a machine learning model, metadata for the individual documents and forms, wherein the metadata includes structural attributes extracted from the individual documents and forms, and company relevant parameters identified from business intelligence for the organization;
  - builds a new index document, wherein the new index document comprises values for the extracted metadata;
  - compares the index attributes of the new index document with other stored index documents stored in an indexed documents database;
  - identifies a subset of documents in the indexed documents database that have index attributes similar to the new index document;
  - stores the new index document in association with the metadata;
  - indexes the new index document and re-indexes the index documents with similar index attributes;
  - responsive to storing the new index document, generates an event message, wherein the event message comprises information about the storing of the new index document;
  - publishes the event message to a message pipeline; and
  - notifies a subscribed client device about the event message, including a notification of availability of the individual documents and individual forms separated from the output.

9. The computer system of claim 8, wherein in indexing the individual documents and forms, the document storage system further:
- extracts structural metadata from the individual documents and forms;
- identifies the company relevant parameters from a database of business intelligence for the organization;
- builds an index document for each of the individual documents and forms, wherein each index document includes the structural metadata and the company relevant parameters; and generates an index from the index documents.

10. The computer system of claim 9, wherein the company relevant parameters comprise:
- a category of information about human resources, wherein the category is selected from the group consisting of payments, benefits, and training;
- an intended audience within an organization, wherein the intended audience indicates employees to whom the information is relevant, wherein the intended audience is selected from the group consisting of employees and managers; and
- a department in the organization, wherein the department indicates divisions of the organization to which the information is relevant, wherein the department is selected from a group consisting of a finances department, a human resources department, a product development department, a marketing department, and a sales department.

11. The computer system of claim 9, wherein the structural attributes extracted from the individual documents and forms comprise:
- a domain identifier, a page name, a section name, a media type, access permissions, a language for the page, a main topic of the page, keywords in the page, and an access/entry point for the page.

12. The computer system of claim 9, wherein the document storage system further:
- receives a search query from a client system, wherein the search query is received within a data context of a user in the organization;
- interprets the search query according to the data context of the user within the organization;
- predicts the most suitable choices for the individual documents and forms based on the data context of the user; and
- identifies at least one of the individual documents and forms according to the interpreted search query.

13. The computer system of claim 12, wherein in identifying at least one of the individual documents and forms, the document storage system further:
- filters the index documents according to the data context of the user within the organization; and
- identifies at least one of the individual documents and forms from a filtered subset of the index documents.

14. The computer system of claim 13, wherein the document storage system further:
- ranks the filtered subset of the index documents according to the data context of user; and suggests the individual documents and forms that correspond to the filtered subset of the index documents as search results.

15. A computer program product for processing an output of batch processed information, the computer program product comprising:
- a machine learning predictive modeling system;
- a computer-readable storage media;
- program code, stored on the computer-readable storage media, for receiving the output of information batch processed from a number of locations in a computer system for an organization;
- program code, stored on the computer-readable storage media, for separating the output into individual documents and individual forms;
- program code, stored on the computer-readable storage media, for extracting, by a machine learning model, metadata for the individual documents and forms, wherein the metadata includes structural attributes extracted from the individual documents and forms, and company relevant parameters identified from business intelligence for the organization;
- program code, stored on the computer-readable storage media, for building a new index document, wherein the new index document comprises values for the extracted metadata;
- program code, stored on the computer-readable storage media, for comparing the new index document with other stored index documents stored in an indexed document database;
- program code, stored on the computer-readable storage media, for identifying a subset of documents in the indexed documents database that have index attributes similar to the new index document;

program code, stored on the computer-readable storage media, for storing the new index document in association with the metadata;

program code, stored on the computer-readable storage media, for indexing the new index document and re-indexing the index documents with similar index attributes;

program code, stored on the computer-readable storage media, for generating an event message in response to storing the new index document, wherein the event message comprises information about the storing of the new index document;

program code, stored on the computer-readable storage media, for publishing the event message to a message pipeline; and program code, stored on the computer-readable storage media, for notifying a subscribed client device about the event message, including a notification of availability of the individual documents and individual forms separated from the output.

16. The computer program product of claim 15, wherein the program code for indexing the individual documents and forms further comprises:

program code for extracting structural metadata from the individual documents and forms;

program code for identifying the company relevant parameters from a database of business intelligence for the organization;

program code for building an index document for each of the individual documents and forms, wherein each index document includes the structural metadata and the company relevant parameters; and program code for generating an index from the index documents.

17. The computer program product of claim 16, wherein the company relevant parameters comprise:

a category of information about human resources, wherein the category is selected from the group consisting of payments, benefits, and training;

an intended audience within an organization, wherein the intended audience indicates employees to whom the information is relevant, wherein the intended audience is selected from the group consisting of employees and managers; and a department in the organization, wherein the department indicates divisions of the organization to which the information is relevant, wherein the department is selected from a group consisting of a finances department, a human resources department, a product development department, a marketing department, and a sales department.

18. The computer program product of claim 16, wherein the structural attributes extracted from the individual documents and forms comprise:

a domain identifier, a page name, a section name, a media type, access permissions, a language for the page, a main topic of the page, keywords in the page, and an access/entry point for the page.

19. The computer program product of claim 15, further comprising:

program code, stored on the computer-readable storage media, for receiving a search query from a client system, wherein the search query is received within a data context of a user in the organization;

program code, stored on the computer-readable storage media, for interpreting the search query according to the data context of the user within the organization;

program code, stored on the computer-readable storage media, for predicting the most suitable choices for the individual documents and forms based on the data context of the user; and program code, stored on the computer-readable storage media, for identifying at least one of the individual documents and forms according to the interpreted search query.

20. The computer program product of claim 19, wherein the program code for identifying at least one of the individual documents and forms further comprises:

program code for filtering the index documents according to the data context of the user within the organization; and program code for identifying t at least one of the individual documents and forms from a filtered subset of the index documents.

21. The computer program product of claim 20, further comprising:

program code, stored on the computer-readable storage media, for ranking the filtered subset of the index documents according to the data context of user; and suggesting the individual documents and forms that correspond to the filtered subset of the index documents as search results.

* * * * *